US012114232B2

(12) United States Patent
Tran et al.

(10) Patent No.: US 12,114,232 B2
(45) Date of Patent: Oct. 8, 2024

(54) DEVICE POSITION ACCURACY WITH NETWORK-BASED CROWDSOURCING

(71) Applicant: T-Mobile USA, Inc., Bellevue, WA (US)

(72) Inventors: Emile Tran, Sammamish, WA (US); Antoine Tran, Bellevue, WA (US); Muhammad Khadim, Sammamish, WA (US); Nan Xiao, Mercer Island, WA (US); Tony Fung, Newcastle, WA (US); Chong Kiong, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/527,180

(22) Filed: Dec. 1, 2023

(65) Prior Publication Data

US 2024/0098456 A1  Mar. 21, 2024

Related U.S. Application Data

(63) Continuation of application No. 17/539,888, filed on Dec. 1, 2021, now Pat. No. 11,864,059, which is a
(Continued)

(51) Int. Cl.
*H04W 4/029* (2018.01)
*G01S 5/02* (2010.01)
(Continued)

(52) U.S. Cl.
CPC ......... *H04W 4/029* (2018.02); *G01S 5/02524* (2020.05); *G01S 5/0284* (2013.01); *H04B 17/327* (2015.01); *H04W 4/022* (2013.01)

(58) Field of Classification Search
CPC .... H04W 4/029; H04W 4/022; H04B 17/327; G01S 85/02524; G01S 85/0284
(Continued)

(56) References Cited

U.S. PATENT DOCUMENTS 11,864,059 B2   1/2024  Tran et al.
2008/0188242 A1  8/2008  Carlson et al.
(Continued)

OTHER PUBLICATIONS

Apidet et al: "RSSI-Based Indoor Localization Using Multi-Lateration With Zone Selection and Virtual Position-Based Compensation Methods", IEEE Access, IEEE, USA, vol. 9, Mar. 23, 2021 (Mar. 23, 2021), pp. 46223-46239, XP011847008, DOI: 10.1109/ACCESS.2021.3068295 [retrieved on Mar. 26, 2021].
(Continued)

*Primary Examiner* — Ted M Wang

(57) ABSTRACT

Techniques for calculating a location of a position consumer device is disclosed. In one example, a network server may create a fingerprint map from reference data points. Each of the reference data points may include a recorded geo-location of a position source device and signal measurements taken at that recorded geo-location. By initially estimating an initial position of the position consumer device, the network server may apply one or more threshold values to filter reference data points—candidates for interpolation. The network server may then perform an interpolation on one or more pairs of reference data points to find a pair of reference data points that is collinear with the estimated position of the position consumer device. The location of the position consumer device may then be calculated based upon geo-locations of position source devices that are associated with collinear reference data points.

20 Claims, 6 Drawing Sheets

Related U.S. Application Data continuation-in-part of application No. 17/220,757, filed on Apr. 1, 2021, now abandoned.

(51) Int. Cl.
  *H04B 17/327* (2015.01)
  *H04W 4/021* (2018.01)

(58) Field of Classification Search
  USPC .................................................. 455/456.1
  See application file for complete search history.

(56) References Cited

U.S. PATENT DOCUMENTS

| | | | |
|---|---|---|---|
| 2014/0274115 A1* | 9/2014 | Michalson | H04W 4/029 455/456.1 |
| 2015/0045057 A1 | 2/2015 | Tee et al. | |
| 2018/0020329 A1 | 1/2018 | Smith | |

OTHER PUBLICATIONS

Boujnah et al: "Crowdsourcing based terminal positioning using linear and non-linear interpolation techniques", 2016 Advances in Wireless and Optical Communications (RTUWO), IEEE, Nov. 3, 2016 (Nov. 3, 2016), pp. 101-106, XP033046739, DOI: 10.1109/RTUW0.2016.7821864 [retrieved on Jan. 17, 2017].

Christos et al: "A Survey of Enabling Technologies for Network Localization, Tracking, and Navigation", IEEE Communications Surveys Tutorials, vol. 20, No. 4, pp. 3607-3644, XP011698277, DOI: 10.1109/COMST.2018.2855063 [retrieved on Nov. 19, 2018].

European Patent Application No. 22166219.0, Extended Search Report mailed Oct. 12, 2022, 4 pages.

U.S. Appl. No. 17/539,888, Notice of Allowance mailed Aug. 18, 2023, 54 pages.

U.S. Appl. No. 17/539,888, Office Action mailed Apr. 27, 2023, 57 pages.

\* cited by examiner

DEVICE POSITION ACCURACY WITH NETWORK-BASED CROWDSOURCING

CROSS-REFERENCE TO RELATED APPLICATIONS

This application is a continuation of and claims priority under 35 U.S.C. § 120 to U.S. patent application Ser. No. 17/539,888 filed Dec. 1, 2021, entitled "Device Position Accuracy with Network-Based Crowdsourcing" by Emile Tran, et al., which is a continuation-in-part of U.S. patent application Ser. No. 17/220,757 filed Apr. 1, 2021, entitled "Device Position Accuracy with Network-Based Crowdsourcing" by Emile Tran, et al., both of which are incorporated by reference in their entirety for all purposes.

BACKGROUND

The use of mobile devices, such as smartphones, has become common. Many of these mobile devices include a capability to determine their geographic physical location. That is, the mobile device is capable of determining its location in the real world.

One common mode for determining the location of the mobile device is the use of a Global Positioning System (GPS). The GPS is a system in which the mobile devices locate themselves by measuring radio signal time-of-flight from a subset of GPS satellites. The GPS may be characterized as fairly accurate (e.g., about three to five meters with a clean signal); however, the GPS is known for high power consumption. Typically, the GPS may draw 45-150 mW on most mobile devices. It's desirable that a device without a high-power positioning service like GPS is able to accurately determine its geo-location.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

Figure 1:
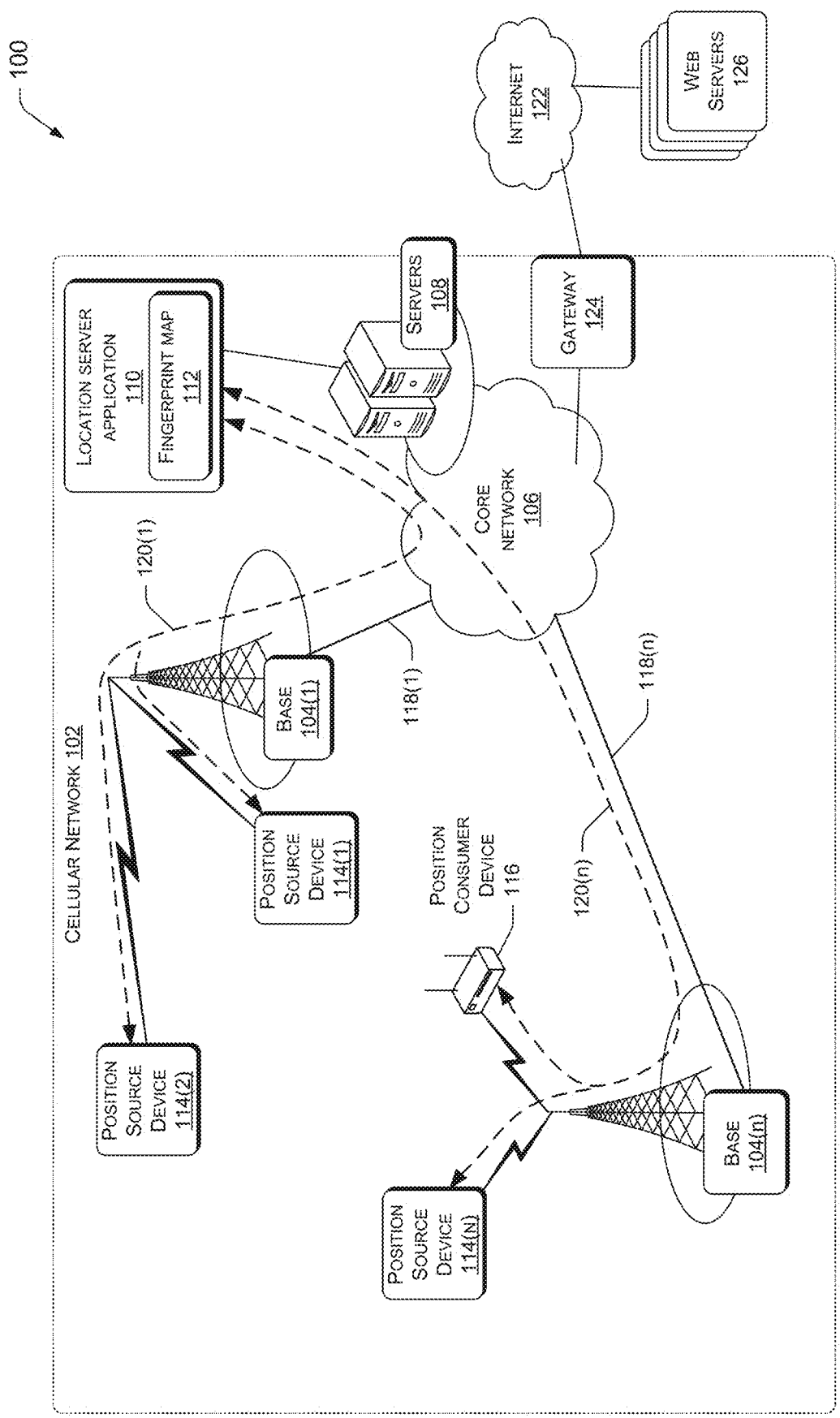
FIG. 1 is a diagram of an example cellular network environment in which the technological solutions described herein may be implemented.

This disclosure is directed to techniques for leveraging known geo-locations of base stations and position source devices in a crowdsourced signal fingerprint map to improve accuracy in locating one or more position consumer devices. Position source devices may include electronic devices with precise positioning capabilities that are configured and/or utilized to collect position survey data to create the fingerprint map. Conversely, position consumer devices may include electronic devices that that can detect and transmit signal measurements but lack precise positioning capabilities. In one embodiment, the fingerprint map may include reference data points that are formed from the position survey data. Each reference data point may correspond to a pairing between a recorded geo-location of the position source device and signal measurements taken by the position source device on that recorded geo-location. Alternatively, or additionally, each reference data point may correspond to a substantially real-time geo-location of the position source device and the paired signal measurements taken at that substantially real-time geo-location. By using calculation algorithms such as a trilateration method to find an estimated position of the position consumer device, pre-filtering algorithm to narrow a number of the reference data points to be interpolated, and interpolation algorithm to find a pair of collinear reference data points, then the location of the estimated position of the consumer device may be calculated using the known geo-locations associated with the collinear pair of reference data points. As described herein, the signal measurement(s) may include Reference Signal Received Power (RSRP), Radio Time Delay Map, Angle of Arrival (AoA), Angle of Departure (AoD), Timing Advance (TA), and/or Observed Time Difference Of Arrival (OTDOA) measurement.

In one example, a mobile network operator (MNO) network server may create the crowdsourced signal fingerprint map by leveraging its capability to track and/or collect the position survey data from the position source devices. Given a situation where the network server receives a signal measurement from a particular position consumer device to be located, the network server may use the received signal measurement in a trilateration method to estimate the position of the position consumer device in the fingerprint map. The estimated position of the position consumer device may include an approximate location of the position consumer device in the fingerprint map where accuracy of the approximate location can be further refined or improved using the implementations as described herein. For example, depending upon how dense the created fingerprint map is, there is a substantial possibility that the fingerprint map may not have the reference data point with an exact associated signal measurement that matches the received signal measurement taken by the position consumer device. In this regard, pre-filtering and interpolating of filtered reference data points may be implemented.

In one example, the pre-filtering may use a first threshold value to identify the reference data points in the fingerprint map that are near the estimated position of the position consumer device. The reference data point is near the estimated position when the geo-location associated with the reference data point is physically closer in distance to the estimated position. For example, the first threshold value may include a physical distance limit of 1000 meters radius from the estimated position of the position consumer device.

In this example, the reference data points that are within the 1000 meters radius may be treated to be "near" the estimated position of the position consumer device. Upon identification of the reference data points that are near the estimated position of the position consumer device, a second threshold value may be further applied to narrow the number of candidates—reference data points to be interpolated.

For example, the network server may form a signal measurement range limit by adding and subtracting an arbitrary value to the signal measurement that is received from the position consumer device to be located. In this example, the formed signal measurement range limit may be used by the network server as the second threshold value to further filter the number of candidates—reference data points to be interpolated.

Following the application of the one or more threshold values, the network server may select pairs of filtered reference data points with each pair having associated signal measurements that bracket the signal measurement from the position consumer device to be located. In this embodiment, the network server may interpolate each of the selected pairs of filtered reference data points to find the pair that is collinear with the estimated position of the position consumer device. Upon finding the pair of collinear reference data points, the network server may use the geo-locations of the position source devices that are associated with the collinear reference data points to calculate the location of the position consumer device.

Details regarding the novel techniques reference above are presented herein and are described in detail, below, with respect to several figures that identify elements and operations used in and/or with systems, devices, methods, and computer-readable storage media that implement the techniques.

Example Network Environment

FIG. 1 is a diagram of an example cellular network environment 100 in which the technological solutions described herein may be implemented. FIG. 1 illustrates an environment for which the embodiments described at subsequent figures can be implemented. FIG. 1 illustrates a concept of locating a position consumer device based on reference data points in a crowdsourced signal fingerprint map as described herein. By design, position consumer devices such as IoT devices, personal or asset trackers, house sensors, and battery efficient wildlife sensors may not have the capabilities to accurately track their respective locations due to their configurations to meet low cost and battery life requirements. However, these position consumer devices can at least measure signals and send signal measurements to an external device such as a network server. In one example, the network server may use the signal measurements from the position consumer device in a trilateration method to estimate a position of the position consumer device in the fingerprint map. Following this estimation, the network server may use one or more threshold values to filter the reference data points to be interpolated. The network server may then interpolate filtered reference data points to find a pair of reference data points that are collinear (or substantially collinear) with the estimated position of the position consumer device. The collinear pair of reference data points may form an imaginary line with the estimated position of the position consumer device lying or substantially lying on the formed imaginary line. Given the known geo-locations of the position source devices that are associated with the collinear reference data points, the network server may use simple distance calculations to locate the position consumer device in the fingerprint map.

Following the calculation of the location of the position consumer device, it may be possible for the network server to transform the position consumer device into a position source device and/or cause the position consumer device to take on the additional role of position source device. In this case, the network server may pair the calculated location of the position consumer device with the signal measurements taken at that location to form a new reference data point that will be added to the fingerprint map.

As shown, the cellular network environment 100 may include a cellular network 102 that is provided by a wireless telecommunication carrier. It is noted that, although the present discussion refers to a cellular network, other network architectures may be used in place of the cellular network shown and described with respect to FIG. 1. The cellular network 102 includes, for example, cellular network base stations 104(1)-104(n) and a core network 106. The core network 106 may further include one or more servers 108 that can implement a location server application 110.

Each one of the base stations 104(1)-104(n) may serve as a hub of the local wireless network and/or a gateway between a wired network and a wireless network. The core network 106 may provide telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), 5G and/or so forth. The location server application 110 may include a program that uses the tracked or collected position survey data to form the reference data points, which are further integrated to create a crowdsourced signal fingerprint map 112.

The created fingerprint map 112 may include a plurality of reference data points that are collated from the position survey data. Each of the reference data points may include a pairing between the geo-location of the position source device and the one or more signal measurements taken at that geo-location. The one or more signal measurements may include, for example, the Reference Signal Received Power (RSRP), Radio Time Delay Map, Angle of Arrival (AoA), Angle of Departure (AoD), Timing Advance (TA), and Observed Time Difference On Arrival (OTDOA) of positioning reference signals (PRS). The RSRP may include an average received power of a Reference Signals (RS) resource element. RSRP is the average power of multiple resource elements that are used to transfer the RS. Radio Time Delay map is various time delays due to multipath signal reflections. AoA includes the angle or direction from which the signal is received. AoD includes the angle or direction from which the signal is transmitted. TA measurement corresponds to a length of time for a signal to reach the base station from a mobile device. OTDOA can be observed between the reception of downlink signals from two base stations. If a signal from a first base station is received at a timestamp "$t_1$" and another signal from a second base station is received at a timestamp "$t_2$," then the OTDOA is "$t_2$-$t_1$."

The base stations 104(1)-104(n) are responsible for handling data traffic between position source devices, such as position source devices 114(1)-114(n), and the location server application 110. Further, the base stations 104(1)-104(n) are responsible for establishing wireless communications between position consumer devices, such as a position consumer device 116, and the location server application 110. Each of the base stations 104(1)-104(n) may be communicatively connected to the core network 106 via a corresponding backhaul 118(1)-118(n). Each of the backhauls 118(1)-118(n) may be implemented using copper cables, fiber optic cables, microwave radio transceivers, and/or the like. Accordingly, each one of the position source devices 114(1)-114(n) and the position consumer device 116 may connect to the location server application 110 via the base station 104, backhaul 118, and the core network 106.

For example, the position source device 114(1) may determine its geo-location on a time instant, associate one or more signal measurements taken at that geo-location and time instant, and send this position survey data to the location server application 110 via the base station 104(1), backhaul 118(1), and the core network 106. In this example, a link 120(1) illustrates a path that starts from the position source device 114(1) and ends at the location server application 110. In another example, the position consumer device 116 may send a signal measurement to the location server application 110 via the base station 104(n), backhaul 118(n), and the core network 106. The position consumer device 116 may send the signal measurement taken from signals coming from the base stations 104, for example, but not its geo-location, which is yet to be determined as described herein. In this other example, a link 120(n) illustrates a path that starts from the position consumer device 116 and ends at the location server application 110. In these examples, the position survey data from the position source devices 114(1)-114(n) may be used to create the fingerprint map 112 while the signal measurements from the position consumer device 116 may be used as a reference for locating the position consumer device 116.

Each one of the position source devices 114 may include an electronic communication device such as a cellular phone, a smartphone, a session initiation protocol (SIP) phone, a laptop, a personal digital assistant (PDA), a satellite radio, a global positioning system (GPS), IoT devices with tracking mechanism, a multimedia device, a video device, a camera, a game console, a tablet, a smart device, a wearable device, or any other similar device equipped with precise positioning capabilities. Further, each one of the position source devices 114 may collect and send position survey data to the location server application 110.

On the other hand, the position consumer device 116 may include the electronic communication device that is not equipped with precise positioning capabilities although the electronic communication device is capable of receiving one or more signal measurements to be sent to the location server application 110. In one example, the one or more signal measurements may be used as references by the location server application 110 to determine the location of the position consumer device 116 in the fingerprint map 112. Each reference data point in the fingerprint map 112 may include one or more types of signal measurements that can be used as references for determining the location of the position consumer device 116.

In one example, each one of the position source devices 114(1)-114(n) and position consumer device 116 may be capable of connecting to an Internet 122 via a gateway 124. Additionally, apart from the cellular network 102, the cellular network environment 100 includes multiple web servers 126 that may be accessed through the Internet 122.

In an example embodiment, the location server application 110 may track, collect, and/or store position survey data from hundreds of thousands of position source devices 114 in the cellular network environment 100. The location server application 110 may utilize the position survey data to form reference data points, which are collated to create the crowdsourced signal—fingerprint map 112. For each reference data point in the fingerprint map 112, the location server application 110 may associate device identification of the position source device, latitude, and longitude for the geo-location, the corresponding one or more signal measurements that were taken at the geo-location, timestamps for the one or more signal measurements, and other information that relates to localization and mapping of signal measurements to create the fingerprint map 112.

With the created fingerprint map 112, the location server application 110 may leverage these reference data points to calculate the location of the position consumer device 116. In one example, the location server application 132 may receive a signal measurement from the position consumer device and use the received signal measurement in a trilateration method to estimate a position of the position consumer device 116. The trilateration method may use different signal measurements taken by the position consumer device 116 from at least three base station signal sources. With the estimated position of the position consumer device 116, the location server application 110 may use a first threshold value to search for reference data points in the fingerprint map 112 that are near the estimated position of the position consumer device 116. The reference data points may be near the estimated position of the position consumer device 116 when they satisfy the first threshold value as described herein. The first threshold value may be used to narrow the number of reference data points that can be utilized to locate the position consumer device 116. For example, the location server application 110 may use a first threshold value of 1000 meters radius value from the estimated position of the position consumer device 116 to identify the reference data points that are near or within 1000 meters from the estimated position of the position consumer device 116 in the fingerprint map 112. Further, the location server application 110 may use a second threshold value to filter these identified reference data points that are near the estimated position of the position consumer device 116.

In one example, the second threshold value may include a signal measurement range limit that can be formed by adding an arbitrary value to the signal measurement that is received from the position consumer device to be located. For example, if the signal measurement from the position consumer device 116 is 10 mW RSRP, then the location server application 110 can add a first arbitrary value for an upper limit and subtract a second arbitrary value for a lower limit of the signal measurement range limit In another example, the second threshold value may include a time window that filters the reference data points based upon timestamps of the signal measurements in the reference data points. For example, the second threshold value filters the reference data points that were not updated in the last 30 days. After the application of the first and second threshold values to filter the reference data points, the location server application 110 may select one or more pairs of reference data points that will be interpolated.

In an embodiment, the location server application 110 may select the pair of filtered reference data points with associated signal measurements that form a signal measurement range that brackets the received signal measurement from the position consumer device to be located. The signal measurement range formed by the associated signal measurements may bracket the received signal measurement when the value of the received signal measurement is within the formed range. For example, the received signal measurement is 10 mW of RSRP measurement and the respective reference data points in the selected pair are associated with signal measurements of 5 mW and 15 mW. In this example, the associated signal measurements form a signal measurement range of 5 mW-15 mW that brackets the 10 mW-received signal measurement. In another example, the received signal measurement is 10 mW of RSRP measurement and the respective reference data points in the selected pair are associated with signal measurements of 9 mW and 12 mW. In this example, the associated signal measurements form a signal measurement range of 9 mW-10 mW that brackets the 10 mW-received signal measurement, and so on.

Following this selection, the location server application 110 may interpolate each of the selected pairs of reference data points to find the pair that is collinear with the estimated position of the position consumer device 116. Based on known geo-locations associated with the pair of collinear reference data points, the exact location of the position consumer device 116 can be calculated by simple distance and angle formulas. Further details of improving device position accuracy are described in subsequent figures.

Example Crowdsourced Signal Fingerprint Map

Figure 2:
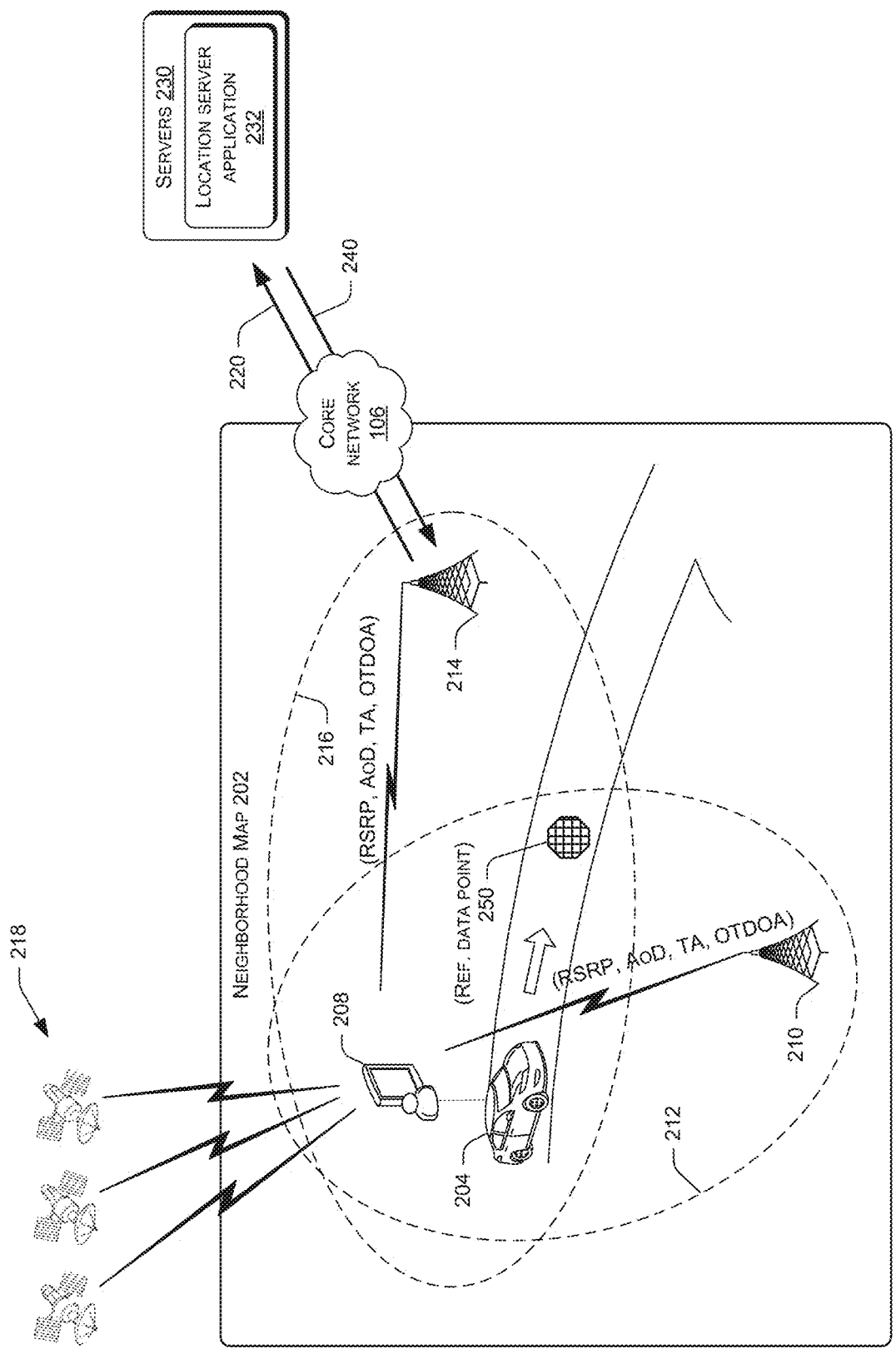
FIG. 2 is a diagram of an example scenario that illustrates a development of a crowdsourced signal—fingerprint map to improve device position accuracy in accordance with the technologies described herein.

FIG. 2 shows an example scenario 200 that illustrates obtaining of the position survey data to be used in creating the crowdsourced signal—fingerprint map such as the fingerprint map 112 of FIG. 1. Crowdsourcing may involve a process of outsourcing tasks to a distributed group of people or position source devices. Unlike outsourcing, crowdsourcing typically is done by a seemingly undefined public (e.g., crowd) rather than a well-defined group. In one example, a user may choose to participate in this fingerprint map creation by downloading a mobile device application (not shown) and logging in to participate. A participating mobile device with precise positioning capability may then collect position survey data and contribute to the development of the fingerprint map as the mobile device moves about an area such as a neighborhood map 202. In one instance, thousands or hundreds of thousands of participating mobile devices collectively contributing geo-locations and associated signal measurements may generate the position survey data to create the crowdsourced signal-fingerprint map for the neighborhood map 202.

As illustrated, the neighborhood map 202 shows an automobile 204 on a road that has a driver or passenger with a mobile device 208, which corresponds to the position source device 114 of FIG. 1. The neighborhood map 202 further shows a first base station 210 with a signal range 212, and a second base station 214 with a signal range 216. The signal ranges for the first base station 210 and the second base station 214 may overlap with the present location of the mobile device 208 such that the mobile device 208 may perform one or more signal measurements (e.g., RSRP, AoA, AoD, TM, and OTDOA measurements) on the signals from the first station 210 and/or the second base station 214. The geo-location of the mobile device 208 and the one or more signal measurements taken at that geo-location are collected and/or stored by the mobile device 208 as position survey data. As the automobile 204 moves around, the mobile device 208 may acquire a reading from GPS satellites 218, for example, to determine its geo-location when collecting the position survey data.

With the collected position survey data, the mobile device 208 may upload 220 the collected position survey data to one or more network servers 230 via the core network 106. In one example, the network servers 230 may include a location server application 232 that implements the locating of the position consumer devices as described herein. In response to the received position survey data, the location server application 232 may send a notification 240 back to the transmitting mobile device 208. In one example, the notification 240 may indicate receiving of the position survey data and/or requesting the mobile device 208 to map a specific area in the neighborhood map 202.

In one example, the network servers 230 may request the mobile device 208 to collect and upload position survey data corresponding to a particular area to fill a gap or update the reference data point within that zone or particular area in the fingerprint map. For example, the current reference data points for the neighborhood map 202 are separated by large gaps. In this example, the network servers 230 may request the mobile device 208 to upload pairings of geo-location readings and corresponding signal measurements in a specific grid to fill the large gaps. In another example, the network servers 230 may update the reference data points in a specific area by requesting the mobile device 208 to upload new position survey data at the same specific area in the fingerprint map. In this other example, the timestamps for the new position survey data may be used as a threshold value during the filtering of the number of reference data points for purposes of interpolation.

Referring to the neighborhood map 202, a reference data point 250 is one of the many reference data points that can be derived from the collected survey position data as the mobile device 208 moves in the neighborhood. The reference data point 250 may include or is representative of a pairing between a geo-location and signal measurements taken by the mobile device 208 at that geo-location. For example, the geo-location associated with the reference data point 250 includes a latitude of 38.123 and a longitude of 150.789. In this example, the signal measurements taken by the mobile device 208 in the same geo-location may include a 15 mW RSRP measurement, a −50 dBm received signal strength indicator (RSSI) measurement, and a received channel power indicator (RCPI) measurement of 55. This information about the reference data point 250 and multiple other reference data points are stored and used by the location server application 232 to create the crowdsource signal—fingerprint map, such as the fingerprint map 112 of FIG. 1.

Example Network Server Environment

Figure 3:
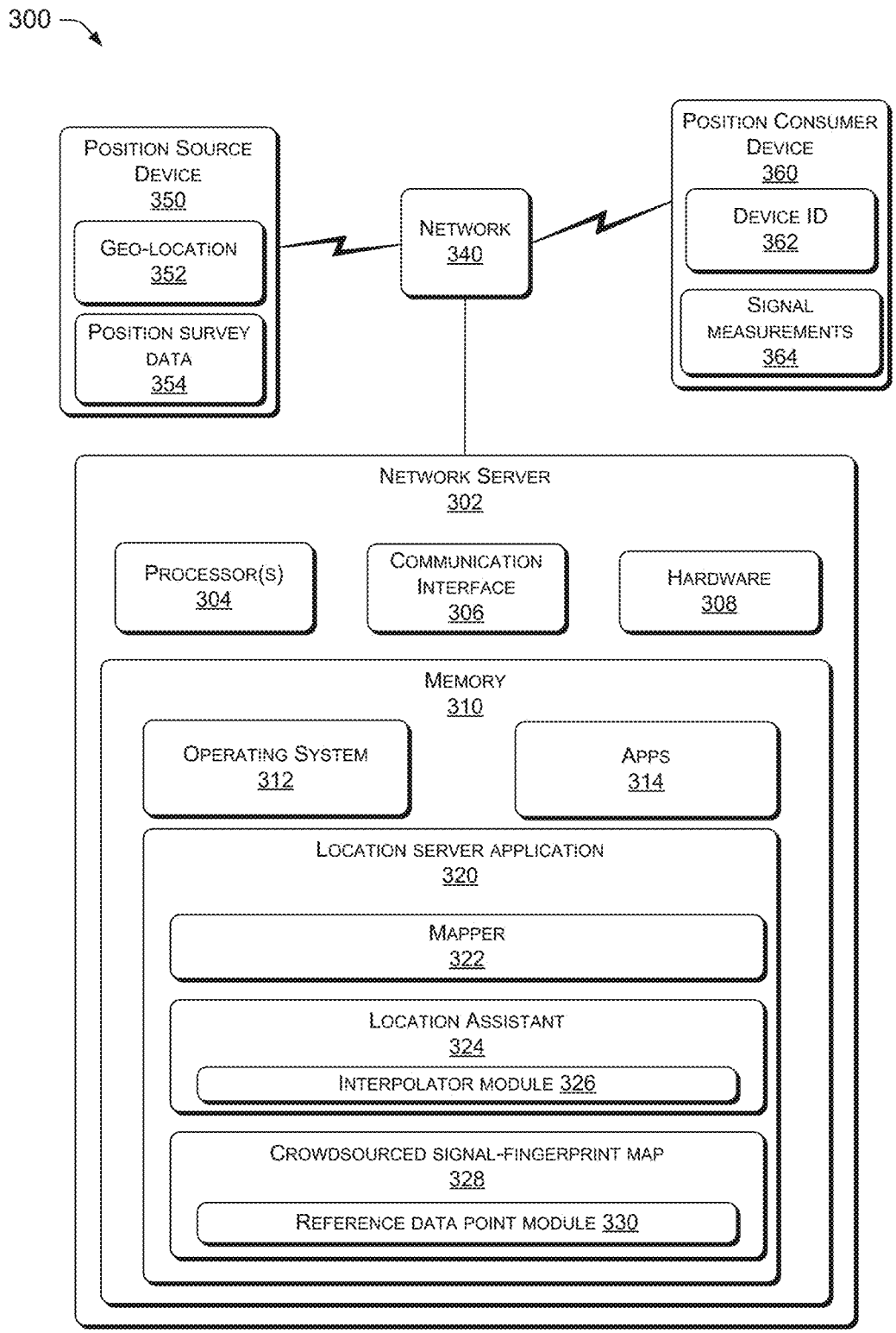
FIG. 3 is an example diagram of a network server environment in accordance with the technologies described herein.

FIG. 3 is a diagram of an example network server environment 300 in accordance with the technologies described herein. The network server environment 300 includes a network server 302 that corresponds to the one or more of the servers 108 of FIG. 1. The network server 302 may be communicatively connected, via a network 340, to a position source device 350 and a position consumer device 360. The position source device 350 and the position consumer device 360 correspond to the position source device 114 and the position consumer device 116, respectively, of FIG. 1.

The network server 302 includes one or more processors 304 having electronic circuitry that executes instruction code segments by performing basic arithmetic, logical, control, memory, and input/output (I/O) operations specified by the instruction code. The processor 304 can be a product that is commercially available through companies such as Intel® or AMD®, or it can be one that is customized to work with and control and particular system.

The network server 302 also includes a communications interface 306 and miscellaneous hardware 308. The communication interface 306 facilitates communication with components located outside the network server 302 and provides networking capabilities for the network server 302. For example, the network server 302, by way of the communications interface 306, may track or collect the position survey data from the position source devices in a particular geographic area. Communications between the network server 302 and the position source devices may utilize any sort of communication protocol known in the art for sending and receiving data and/or voice communications.

The miscellaneous hardware 308 includes hardware components and associated software and/or firmware used to carry out device operations. Included in the miscellaneous hardware 308 are one or more user interface hardware components not shown individually—such as a keyboard, a mouse, a display, a microphone, a camera, and/or the like—that support user interaction with the network server 302.

The network server 302 also includes memory 310 that stores data, executable instructions, modules, components, data structures, etc. The memory 310 may be implemented using computer-readable media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc—Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms.

An operating system 312 is stored in the memory 310 of the network server 302. The operating system 312 controls functionality of the processor 304, the communications interface 306, the miscellaneous hardware 308, and couples the processor 304 with the memory 310. Furthermore, the operating system 312 includes components (not shown) that enable the network server 302 to receive and transmit data via various inputs (e.g., user controls, network interfaces, and/or memory devices), as well as process data using the processor 304 to generate output. The operating system 312 can include a presentation component that controls presentation of output (e.g., display the data on an electronic display, store the data in memory, transmit the data to another electronic device, etc.). Additionally, the operating system 312 can include other components that perform various additional functions generally associated with a typical operating system. The memory 310 that is in communication with the processor 304 also stores various software applications 314, or programs, that provide or support functionality for the network server 302, or provide a general or specialized device user function that may or may not be related to the example computing device per se.

The memory 310 also stores a location server application 320 that, when executed, creates the crowdsourced signal fingerprint map from the collected or tracked position survey data. The location server application 320 may use the created fingerprint map to locate the one or more position consumer devices, such as then position consumer device 360. The location server application 320 may be a single block of executable instructions or it may be made up of several components, as shown. The components included in at least one implementation are described below. However, it is noted that in other implementations, more or fewer components may be configured and that one or more operations attributed to a particular component in the following description may be implemented in one or more other components.

As shown, the location server application 320 may include a mapper 322, a location assistant 324 with an interpolator module 326, and a crowdsourced signal-fingerprint map 328 with a reference data point module 330.

The mapper 322 may be configured to collate the position survey data from multiple position source devices. Particularly, the mapper 322 may map the received pairings between recorded geo-locations of the position source devices and signal measurements taken at each one of the recorded geo-locations as reference data points in the fingerprint map. The received signal measurements may include RSRP, AoA, AoD, OTDOA, and the like. The geo-locations may include geographic coordinates of the position source device when the signal measurements were taken. These reference data points are then stored in the reference data point module 330 of the crowdsourced signal-fingerprint map 328. In one example, in a situation where the position source device 350 is requested to collect updated position survey data on a specific geo-location, then the mapper 322 may update the corresponding reference data points based upon newly collected position survey data on that specific geo-location.

The crowdsourced signal-fingerprint map 328 may include the reference data points that are formed from the collected position survey data. In one example, the reference data points that were stored in the reference data point module 330 may be used to determine a location of a particular position consumer device, such as the position consumer device 360. However, and following the calculation of the location of the particular position consumer device using the embodiments described herein, the particular position consumer device may be transformed into a position source device. For example, the position consumer device 360 detects a particular signal measurement, and the corresponding geo-location of the position consumer device 360 where signal measurement was taken may be calculated using the implementations described herein. In this example, the calculated geo-location of the position consumer device 360 may be paired with the detected signal measurement to form a new reference data point to be stored in the reference data point module 330.

The location assistant 324 may be configured to calculate the position of the position consumer devices. In one example, the location assistant 324 may use a received signal measurement from the position consumer device 360 to estimate a position of the position consumer device 360 on the fingerprint map. The estimation may include the use of a trilateration method, which is based upon distance measurements from multiple reference points (e.g., base stations). For example, the trilateration works by finding a series of circles that intersect with each other. Each of the series of circles is a representation of the signal measurement taken from a specific source. In this example, the intersection point may indicate an estimated position of the position consumer device.

With the estimated position (based upon the signal measurements from the position consumer device), the location assistant 324 may use threshold values to filter reference data points in the fingerprint map that can be interpolated by the interpolator module 326. The interpolation may be performed to determine the at least one pair of reference data points that are collinear with the estimated position of the position consumer device. Thereafter, the location assistant 324 or the interpolator module 326 may calculate the geo-location of the position consumer device 360 based upon known geo-locations of the position source devices that are associated with the collinear reference data points.

In one example, the location assistant 324 may use a first threshold value to download a portion of the crowdsourced signal fingerprint map 328. For example, the portion includes the reference data points that are near or within 1000 meters from the estimated position of the position consumer device. The location assistant 324 may also use a second threshold value to further narrow the number of reference data points that will be interpolated by the interpolator module 326. In an embodiment, the second threshold value may include a signal measurement range limit that is formed by adding and subtracting arbitrary values to the signal measurement taken by the position customer device to generate the upper and lower limit, respectively, of the signal measurement range limit. For example, the signal measurement taken by the position customer device is 8 mW of RSRP measurement. In this example, the processors 304 in conjunction with the location assistant 324 may add 6 mW of RSRP measurement for the upper limit and subtract 2 mW of RSRP measurement for the lower limit to produce 4 mW-12 mW of RSRP signal measurement range.

Following the application of the one or more threshold values above, interpolator module 326 may search for pairs of reference data points with associated signal measurements forming a range that brackets the signal measurement taken by the position consumer device. In an embodiment, the signal measurements associated with a pair of reference data points bracket the signal measurement taken by the position consumer device when the signal measurement taken by the position consumer device is within the range formed by the associated signal measurements.

Following the selection of the pairs of reference data points with associated signal measurements that bracket the signal measurement taken by the position consumer device, the interpolator module 326 may perform the interpolation of the pairs of reference data points to find the pair that is collinear with the estimated position of the position consumer device. The interpolator module 326 may also calculate the location of the position consumer device based upon the known geo-locations of the position source devices that are associated with the collinear reference data points.

In one example, the position source device 350 may include components such as a geo-location 352 and position survey data 354. The position source device 350 may collect position survey data as it moves in a particular geographic area and store the recorded geo-locations and corresponding signal measurements in the geo-location 352 and position survey data 354, respectively. In various embodiments, the position source device 350 may periodically send the position survey data to the network server 302.

The position consumer device 360 may include electronic devices that can detect signal measurements and send the detected signal measurements to the network server 302. In one example, the position consumer device 360 may include a device identification (ID) 362 and signal measurements 364. In this example, the position consumer device 360 stores the detected signal measurement in signal measurements module 364. The signal measurement is transmitted to the network server 302 where the transmitted signal measurement is used to locate the position consumer device 360.

Further functionality of the network server 302 and its component features is described in greater detail, below, with respect to examples of methodological implementations of the novel techniques described and claimed herein.

Example Calculation of Location of Position Consumer Device

Figure 4:
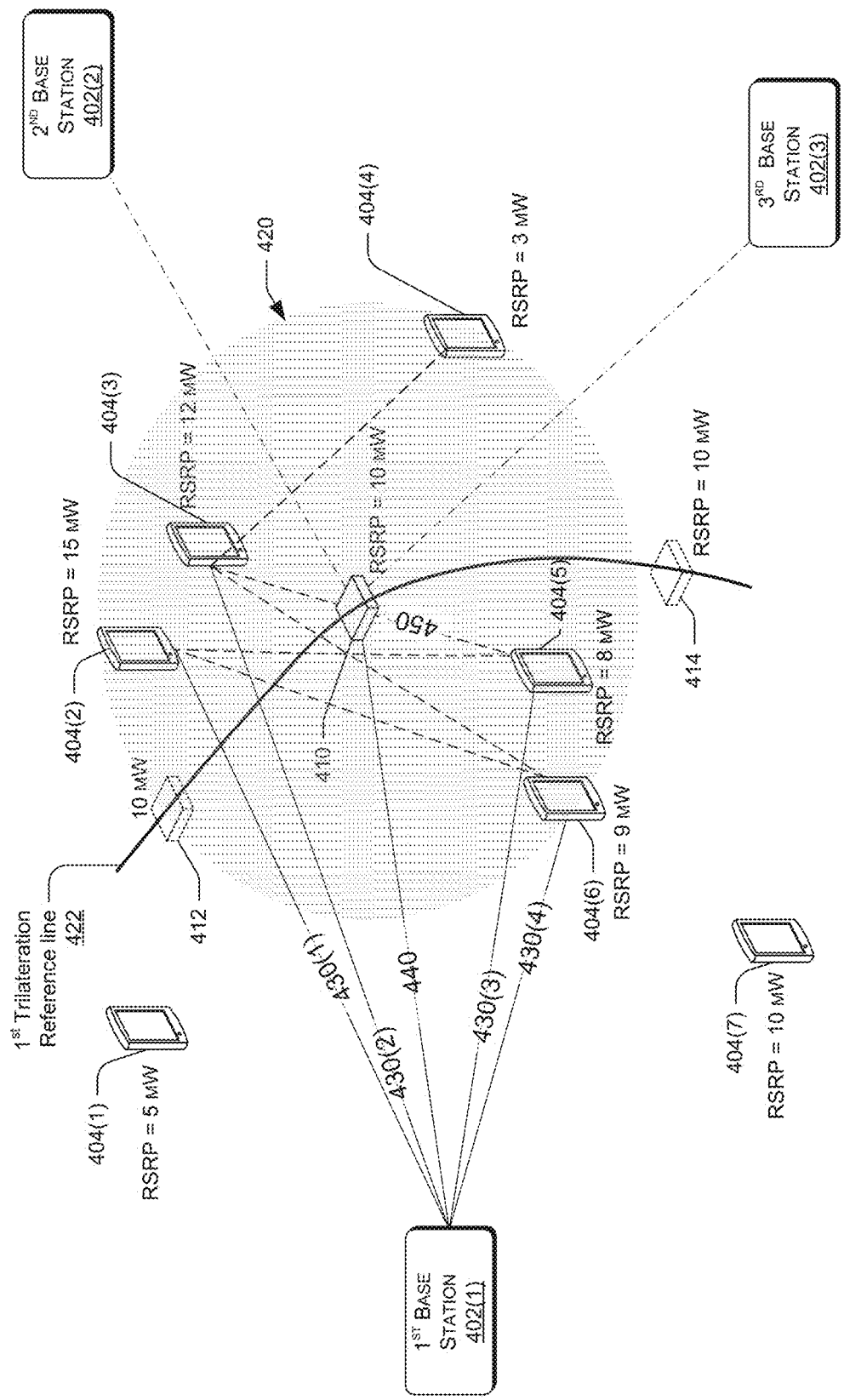
FIG. 4 is a flow diagram of an example scenario that illustrates an example calculation of a location of a position consumer device in accordance with the technologies described herein.

FIG. 4 illustrates an example scenario 400 showing a calculation of the location of the position consumer device based upon known geo-locations of nearby reference data points and base stations in the formed fingerprint map such as the crowdsourced signal-fingerprint map 328 of FIG. 3. The example scenario 400 illustrates the trilateration method based on RSRP measurements that are associated with the reference data points and the RSRP measurement taken by the position consumer device from each one of the three base stations. While the example trilateration method is using RSRP measurements, the position consumer device may also measure time of arrival (TOA) of signals received from multiple base stations to form the OTDOA measurements. For example, each of the TOAs from first and second base stations is subtracted from the TOA of a reference third base station to form the OTDOA measurements. In this example, the trilateration method may use the difference in TOAs to estimate the position of the position consumer device.

Referencing the example scenario 400, the network server may receive RSRP signal measurements taken by the position consumer device from each of at least three base station signals. The network server may use the received RSRP measurements in the trilateration method to obtain an estimated position of the position consumer device in the fingerprint map. With the estimated position of the position consumer device, the network server applies one or more threshold values to filter the number of candidates—reference data points that can be interpolated. Thereafter, the network server may select pairs of reference data points with each pair being associated with signal measurements that bracket the signal measurement taken by the position consumer device. The network server may interpolate each of the selected pairs of reference data points to find the pair that is collinear with the estimated position of the position consumer device. Upon finding the pair of collinear reference data points, the network server may calculate the location of the position consumer device based upon the known geo-locations of the position source devices that are associated with the collinear reference data points.

The example scenario 400 shows base stations 402(1)-402(3), position source devices 404(1)-404(7) with associated signal measurements taken from the first base station 402(1), position consumer device 410, and a threshold coverage range 420. Each one of the position source devices 404(1)-404(7) in the example scenario 400 is representative of the reference data point in the fingerprint map (e.g., fingerprint map 112 of FIG. 1). For example, a first reference data point includes a first GPS location of the position source device 404(1) and the signal measurement of 5 mW RSRP taken at the first GPS location. In another example, a second reference data point includes a second GPS location of the position source device 404(2) and the signal measurement of 15 mW RSRP taken at the second GPS location, and so on. These reference data points may include collected pairings of geo-locations and signal measurements taken at the corresponding geo-locations. Only seven reference data points are shown for purposes of illustration and hundreds of reference data points may be found within the threshold coverage range 420.

In one example implementation, the position consumer device 410 measures an RSRP of 10 mW from signals coming from the first base station 402(1). The position consumer device 410 may send this RSRP measurement and associated identification of the first base station 402(1) to a network server such as the network server 302 in FIG. 3.

Given this RSRP measurement of 10 mW from the position consumer device 410 to be located, the network server (using the fingerprint map) may estimate multiple possible positions of the position consumer device 410 in the fingerprint map. For example, position consumer devices 410, 412, and 414 may represent the possible estimated locations of the position consumer devices that similarly measure an RSRP of 10 mW from the $1^{st}$ base station 402(1). The position consumer devices 412 and 414 are represented in broken lines to indicate false positive locations of the position consumer device. In this example, the possible estimated positions of the position consumer device in the fingerprint map are then joined with a line to generate a $1^{st}$ trilateration reference line 422. By generating additional $2^{nd}$ and $3^{rd}$ trilateration reference lines (not shown) using signal measurements taken by the same position consumer device from the $2^{nd}$ base station 403-2 and the $3^{rd}$ base station 403(3), respectively, the estimated position of the position consumer device may include the intersection point between the $1^{st}$-$3^{rd}$ trilateration reference lines.

For purposes of illustration, the location of the position consumer device 410 may be shown to be the intersection point, which indicates the estimated position of the position consumer device. This estimated position can be further refined and calculated with higher accuracy by interpolating nearby reference data points. In one example, the network server may use one or more threshold values to narrow the number of reference data points that may be interpolated. The one or more threshold values may be applied consecutively to reduce the number of reference data points to be interpolated. The threshold value may include, for example, a certain physical distance limit (e.g., 1000 meters radius value) from the estimated position of the position consumer device 410 in the fingerprint map. Alternatively, or additionally, the threshold value includes a signal measurement range limit that is formed by adding and subtracting an arbitrary value on the signal measurement that is received from the position consumer device (e.g., 10 mW). By applying these threshold values, the number of reference data points that will be considered for further interpolation may be substantially reduced.

In one example, the threshold coverage range 420 may represent a coverage area that corresponds to the application of the first threshold value. For example, the first threshold value may include a certain distance or radius from the estimated position of the position consumer device 410. In this example, the reference data points that are located within the threshold coverage range 420 may include the initial number of candidates—reference data points that will be interpolated. Alternatively, or additionally, the first threshold value may also include the type of signal measurement that is associated with the reference data points within a particular radius from the position consumer device 410. For example, in addition to the physical distance condition, the reference data points that include RSRP measurements only are included in the possible candidates for interpolation.

Following the initial filtering above, a second threshold value may be applied to further narrow the number of candidates—reference data points that may be interpolated. In an embodiment, the second threshold value may include a signal measurement range limit that can be formed by adding and subtracting a certain arbitrary RSRP amount (e.g., 5 mW of RSRP measurement) to the received RSRP signal measurement (10 mW). The received RSRP measurement is taken by the position consumer device 410 from the first base station 402(1) signals. In this example, the resulting RSRP signal measurement range limit (5 mW-15 mW) may be used as the second threshold value to filter the reference data points to be interpolated. In the illustrated example, the RSRP signal measurements obtained by the position source devices 404(1)-(3) and 404(5)-404(6) are within this signal measurement range limit of 5 mW-15 mW. These position source devices 404(1)-(3) and 404(5)-404(6) are shown to have obtained the RSRP signal measurements of 5 mW, 15 mW, 12 mW, 8 mW, and 9 mW, respectively.

After the application of the first and second threshold values as described above, the network server may select the pairs of reference data points with associated signal measurements that form a signal measurement range that brackets the signal measurement taken by the position consumer device 410. For example, the pairs between position source devices 404(2) and 404(5), 404(2) and 404(6), 404(3) and 404(5), and 404(3) and 404(6), may be associated with signal measurements that bracket the signal measurement taken by the position consumer device 410. Each of these pairs may form a signal measurement range that encompasses the signal measurement taken by the position consumer device 410. For example, the pair between the position source devices 404(2) and 404(5) form a signal measurement range of 8 mW-15 mW. In another example, the pair between the position source devices 404(3) and 404(5) form a signal measurement range of 8 mW-12 mW. In these examples, each of the signal measurement ranges brackets the 10 mW signal measurement taken by the position consumer device 410.

Following the selection of the pairs of reference data points, the network server may perform an interpolation to search for the pair of reference data points that may be collinear with the estimated position of the position consumer device 410. The interpolation may be performed on the selected pairs of reference data points based on the assumption that the location of the position consumer device 410 may be calculated from linearity of signal measurements between two reference data points. Different types of interpolation algorithms may be implemented for purposes of finding the collinear reference data points.

In one example interpolation of the pair of reference data points represented by the position source devices 404(3) and 404(5), an impact of terrain or a building is expressed as "K," an unknown factor in a Free Space Path Loss (FSPL) formula:

$$PM3 = PTO \times \frac{K3}{D3^2} \qquad \text{Eq. 1}$$

where "PM3" is a measured power (e.g., RSRP) taken by the position source device 404(3), "PTO" is power output, and "D3" is a distance 430(2) between the $1^{st}$ base station 402(1) and the position source device 404(3). From this Eq. 1, the value of "K3" would be:

$$K3 = \frac{PM3}{PTO} \times D3^2 \qquad \text{Eq. 2}$$

A similar calculation applies for the position source device 404(5) allowing a determination of "K5":

$$K5 = \frac{PM5}{PTO} \times D5^2 \qquad \text{Eq. 3}$$

where "K5" is an unknown factor associated with the position source device 404(5) while "D5" is a distance 430(3) between the 1$^{st}$ base station 402(1) and the position source device 404(5).

The calculation of the location of the position consumer device 410 may be calculated using the formula below with the two unknown variables—"D" and "K":

$$D = \sqrt{\frac{PT0 \times K}{PM}} \quad \text{Eq. 4}$$

where "D" is an unknown distance 440 between the 1$^{st}$ base station 402(1) and the position consumer device 410 and "K" is the unknown factor.

In one example implementation, the initial determination of "D" in Eq. 4 may start with an extrapolated value of "K" as shown in Eq. 5 below:

$$K = \frac{K5 + K3}{2} \quad \text{Eq. 5}$$

where "K" is one of the unknown variables in Eq. 4.

With this initial assumption, the initial value of "D" may be derived to refine the calculated location of the position consumer device 410. The distance "D" and "K" variables in Eq. 4 may be refined with further iterations such as binary search iteration or other faster convergence iteration to make incremental adjustments to the value of "K" based on the value of "D" found at each iteration.

The above example interpolation may be used to identify the pair of reference data points that are collinear with the estimated position of the position consumer device 410. Following the finding of the pair of collinear reference data points, an imaginary line 450 may connect the pair of reference data points that are represented by position source devices 404(3), 404(5) with the estimated position of the position consumer device 410 lying on the imaginary line. In this example, the distance 440 between the 1$^{st}$ base station 402(1) and the position consumer device 410 may be calculated using the known geo-locations of the position source devices 404(3), 404(5).

Alternatively, or additionally, the calculation of the location of the position consumer device may be implemented by performing first the interpolations to find the possible location of the position consumer device. Thereafter, a trilateration method may be performed to identify the probable location of the position consumer device in the fingerprint map. This alternative implementation is further described in detail below.

Figure 5:
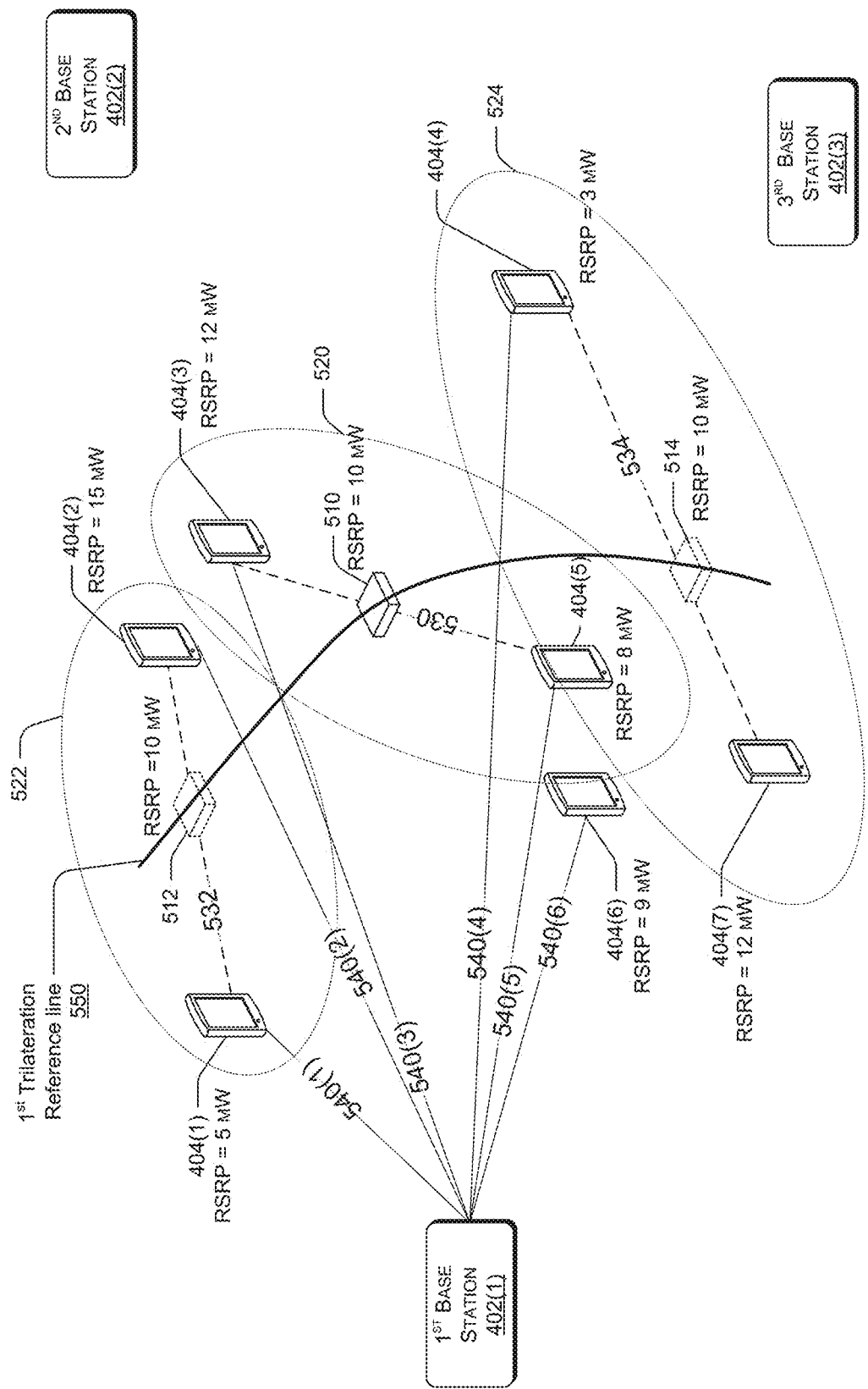
FIG. 5 is a flow diagram of an example scenario that illustrates another example calculation of a location of the position consumer device in accordance with the technologies described herein.

Example Alternative Implementation for Calculating the Position of the Position Consumer Device FIG. 5 illustrates an example scenario 500 showing a calculation of the location of the position consumer device based upon known geo-locations of nearby reference data points and base stations in the formed fingerprint map such as the crowdsourced signal-fingerprint map 328 of FIG. 3. The example scenario 500 is an alternate implementation of scenario 400 in the sense that the interpolations are first performed to find the possible locations of the position consumer device. Following the interpolations, the trilateration method may be performed to eliminate false positive locations and identify the actual location of the position consumer device in the fingerprint map. As opposed to the example scenario 400 of FIG. 4, the trilateration method is first performed to estimate the position of the position consumer device in the fingerprint map and then, later, the interpolations are performed to calculate the position of the position consumer device.

The example scenario 500 similarly shows the base stations 402(1)-402(3) and position source devices 404(1)-404(7) with associated signal measurements taken from the first base station 402(1). Example scenario 500 further shows position consumer devices 510, 512, and 514; threshold coverage ranges 520, 522, and 524; lines 530, 532, and 534 that may be derived after finding the corresponding pairs of collinear reference data points in each threshold coverage range; and distances 540 between the first base station 402(1) and the position source devices 404.

In one example implementation, the position consumer device 510 measures an RSRP of 10 mW from signals coming from the first base station 402(1). Similar to the scenario 400 of FIG. 4, the position consumer device 510 may send this RSRP measurement and associated identification of the first base station 402(1) to the network server, such as the network server 302. Given this RSRP measurement of 10 mW from the position consumer device 410 to be located, the network server (using the fingerprint map) may estimate multiple possible positions of the position consumer device 510. For example, position consumer devices 510, 512, and 514 may represent the possible estimated locations of the position consumer devices that similarly measure an RSRP of 10 mW from the 1$^{st}$ base station 402(1). The position consumer devices 512 and 514 are represented in broken lines to indicate false positive locations of the position consumer device. In this example, each one of the possible locations of the position consumer device in the fingerprint map may be calculated by identifying nearby reference data points, filtering the number of the identified reference data points, and selecting pairs of reference data points with associated signal measurements that bracket the signal measurement from the position consumer devices. Following these processes, the network server may interpolate the selected pairs of reference data points to search for the pairs of collinear reference data points that will be used in calculating the locations of the position consumer devices. Since each of the possible calculated locations of the position consumer device is independently processed, each possible calculated location may utilize a different threshold coverage range when filtering the number of reference data points that are to be interpolated.

For example, with regard to the position consumer device 512, the threshold coverage range 522 may correspond to the first threshold value to identify the reference data points that are to be interpolated. Following the application of the first threshold value, a second threshold value is applied similar to the process of calculating the location of the position consumer device as described in FIG. The process for calculating the location of the position consumer device 512 is similarly implemented with regard to the position consumer devices 510 and 514.

After establishing the possible calculated locations of the position consumer device, a power line is shown to connect these possible calculated locations to create a first trilateration line 550. By generating additional 2 nd and 3 rd trilateration reference lines (not shown) using signal measurements taken by the same position consumer device from the 2 nd base station 403-2 and the 3 rd base station 403(3), respectively, the actual location of the position consumer device may include the intersection point between the 1$^{st}$-3$^{rd}$ trilateration reference lines.

Example Implementation of Calculating a Location of a Position Consumer Device

Figure 6:
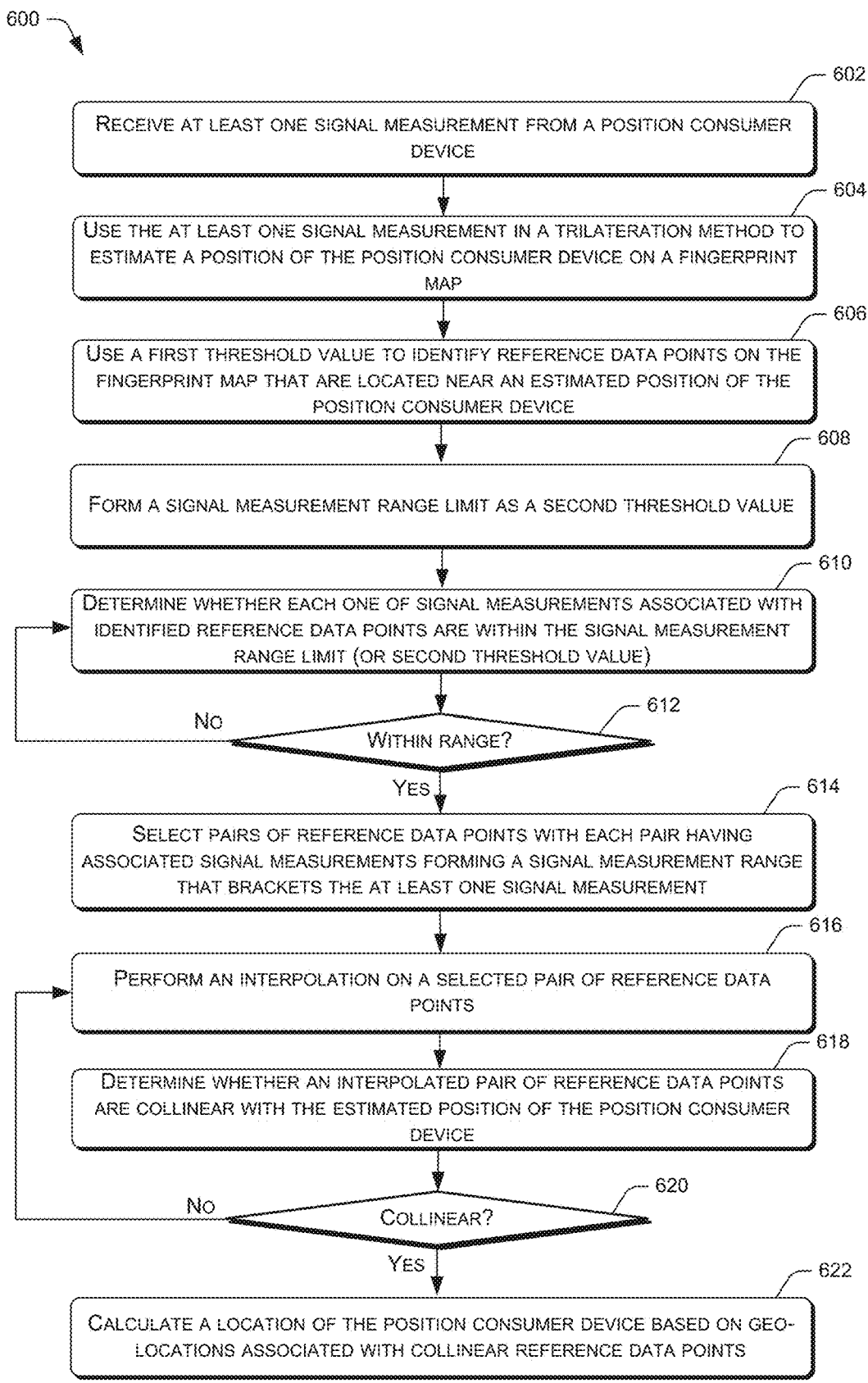
FIG. 6 is a flow diagram of an example methodological implementation for calculating the location of the position consumer device and improving location accuracy in accordance with the technologies described herein.

FIG. 6 is a flow diagram 600 that depicts a methodological implementation of a technique for calculating the location of the position consumer device based on known geo-locations of nearby collinear reference data points. In the following discussion of FIG. 6, continuing reference is made to the elements and reference numerals shown in and described with respect to the network server 302 of FIG. 3. Further, certain operations may be ascribed to particular system elements shown in previous figures. However, alternative implementations may execute certain operations in conjunction with or wholly within a different element or component of the system(s). To the extent that certain operations are described in a particular order, it is noted that some operations may be implemented in a different order to produce similar results.

At block 602, the network server 302 may receive at least one signal measurement from a position consumer device. For example, the position consumer device may perform a signal measurement on signals transmitted by at least one of the base stations. The signal measurement may include the RSRP, AoA, AoD, TA, or OTDOA measurement. In one example, the position consumer device may perform signal measurements on three different base stations. These signal measurements may be used by the network server 302 in the trilateration method.

At block 604, the network server 302 uses the received at least one signal measurement from the position consumer device in a trilateration method to estimate a position of the position consumer device in a fingerprint map. In one example, the network server 302 may create the fingerprint map based on position survey data that are tracked or collected from position source devices. For example, the network server 302 may receive position survey data from position source devices, such as position source devices 114. In this example, the mapper 322 may collate and form reference data points from the position survey data. Each one of the reference data points may include a geo-location and associated signal measurements taken at the geo-location. The mapper 322 may then map the formed reference data points to create a fingerprint map or to update the already existing reference data points on the fingerprint map. For each mapped reference data point, the associated signal measurements may include RSRP, AoA, AoD, TA, OTDOA, or a combination thereof.

With the created fingerprint map, the location assistant 324 may use the received at least one signal measurement in the trilateration method to estimate the position of the position consumer device. The trilateration method may utilize signal measurements from at least three base stations 402 in the fingerprint map to estimate the 2D position of the position consumer device. In one example, signal measurements from the at least three base stations may include uniform types. For example, RSRP measurements from the at least three base stations may be used in the trilateration method.

At block 606, the network server 302 may use a first threshold value to identify the reference data points that are located near the estimated position of the position consumer device. For example, the location assistant 324 may use the first threshold value to identify the position source devices associated with reference data points that are located near the estimated position of the position consumer device. The first threshold value may include a physical distance limit such a radius to define a circular range from the estimated position of the position consumer device. The reference data points that are within the radius may be considered as reference data points that are near the estimated position of the position consumer device. Alternatively, or additionally, the first threshold value may include the type of signal measurement taken by the position consumer device. For example, if the signal measurement received from the position consumer device is RSRP measurement, then the first threshold value, in addition to the physical distance limit, may filter the reference data points to data points that are associated with RSRP measurements.

At block 608, the network server 302 may form a signal measurement range as a second threshold. For example, the location assistant 324 or the processor 304 may form the signal measurement range limit by adding and subtracting a preconfigured value or arbitrary value to the received signal measurement from the position consumer device. Given a situation, for example, where the received signal measurement from the position consumer device is 10 mW of RSRP measurement, then the network server 302 may add and subtract an arbitrary value such as 5 mW of RSRP measurement from the received 10 mW RSRP measurement to form 5 mW-15 mW RSRP signal measurement range limit In this case, the 5 mW-15 mW RSRP signal measurement range limit may be used as the second threshold value to further narrow the number of reference data points that can be interpolated as described herein.

Alternatively, or additionally, the second threshold value may include a particular timestamp (e.g., time period) when the reference data points were last updated. This is based on the assumption that the updated signal measurements for a particular reference data point was taken at the same condition as when the received signal measurement from the position consumer device was taken. In this case, the second threshold value may filter the reference data points based upon the timestamp associated with the signal measurement of the reference data points. For example, the second threshold value may be used to filter the reference data points that were updated outside of a particular time period. In this example, the second threshold value may further narrow the number of reference data points after the application of the first threshold value above.

At block 610, the network server 302 may determine whether each one of the signal measurements that are associated with reference data points after the application of the first threshold value are within the formed signal measurement range limit (or second threshold value). If the signal measurement that is associated with the filtered reference data point is within the signal measurement range limit ("Yes" at block 612), then, at block 614, the network server 302 may select one or more pairs of reference data points having associated signal measurements forming a signal measurement range that brackets the received signal measurement from the position consumer device. However, if the signal measurement that is associated with the filtered reference data point is outside of the signal measurement range ("No" at block 612), then the process goes back to block 610 where the network server 302 continues to determine whether each one of the signal measurements associated with the filtered reference data points is within the signal measurement range.

At block 616, the network server 302 and particularly, the interpolator module 326, may perform an interpolation on a selected pair of reference data points that are associated with signal measurements, which form a signal measurement range that brackets the received signal measurement from the position consumer device.

At block 618, the network server 302 may determine whether an interpolated pair of reference data points are collinear with the estimated position of the position consumer device. If the interpolated pair of reference data points are collinear ("Yes" at block 620), then, at block 622, the location assistant 324 or the processor 304 may calculate a location of the estimated position of the position consumer device based on geo-locations of the pair of position source devices that are associated with the collinear reference data points. However, if the interpolated pair of reference data points are not collinear ("No" at block 620), then, the process goes back to block 616 where the network server 302 may continue to interpolate the next selected pair of reference data points that are associated with different set of signal measurements, which form a signal measurement range that brackets the received signal measurement from the position consumer device.

Alternatively, or additionally, at block 612 when the signal measurement is not within the signal measurement range ("No" at block 612), then the processor 304 may adjust the signal measurement range (second threshold value) to obtain additional reference data point references in the fingerprint map. For example, the second threshold value may include a signal measurement range of 5 mW-15 mW RSRP. In this example, the location assistant 324 or the processor 304 may adjust this range to 3 mW-20 mW RSRP to add more reference data point references as possible candidates for the interpolation. The 3 mW-20 mW RSRP range may be derived by increasing the arbitrary value to be added (e.g., plus 10 mW) or subtracted (e.g., minus 7 mW) on the 10 mW RSRP signal measurement taken by the position consumer device in the above example.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving at least one signal measurement from a computing device;
   based on the at least one signal measurement received from the computing device, determining an estimated position of the computing device;
   selecting a first reference data point that includes (i) first location data that is in a vicinity of the estimated position of the computing device and (ii) a first signal measurement that is greater than the at least one signal measurement received from the computing device;
   selecting a second reference data point that includes (i) second location data that is in the vicinity of the estimated position of the computing device and (ii) a second measurement that is less than the at least one signal measurement received from the computing device; and
   based on the first reference data point and the second reference data point, determining a position of the computing device that reflects an actual position of the computing device more accurately than the estimated position of the computing device.

2. The method of claim 1, wherein determining the estimated position of the computing device comprises determining the estimated position of the computing in a fingerprint map using the at least one signal measurement in a trilateration method.

3. The method of claim 1, comprising:
   selecting reference data points that are within a threshold distance of the estimated position of the computing device,
   wherein the reference data points include the first reference data point and the second reference data point.

4. The method of claim 1, wherein determining the position of the computing device that reflects the actual position of the computing device more accurately than the estimated position of the computing device comprises:
   interpolating the first reference data point and the second reference data point;
   determining whether the interpolated first and second reference data points are collinear with the estimated position of the computing device; and
   determining the position of the computing device based on locations of other computing devices associated with collinear reference data points.

5. The method of claim 1, comprising:
   receiving position survey data from other computing devices; and
   based on the position survey data, generating reference data points,
   wherein the first reference data point and the second reference data points are selected from the reference data points.

6. The method of claim 1, wherein the at least one signal measurement includes a Reference Signal Received Power measurement.

7. The method of claim 1, wherein:
   selecting the first reference data point comprises selecting the first reference data point using a threshold distance from the estimated position of the computing device, and
   selecting the second reference data point comprises selecting the second reference data point using the threshold distance from the estimated position of the computing device.

8. The method of claim 1, wherein determining the position of the computing device that reflects the actual position of the computing device more accurately than the estimated position of the computing device is based on a location of a base station associated with the first and second reference data points.

9. A computer system, comprising:
   one or more processors; and
   memory including a plurality of computer-executable components that are executable by the one or more processors to perform a plurality of acts, the plurality of acts comprising:
      receiving at least one signal measurement from a computing device;
      based on the at least one signal measurement received from the computing device, determining an estimated position of the computing device;
      selecting a first reference data point that includes (i) first location data that is in a vicinity of the estimated position of the computing device and (ii) a first signal measurement that is greater than the at least one signal measurement received from the computing device;
      selecting a second reference data point that includes (i) second location data that is in the vicinity of the estimated position of the computing device and (ii) a second measurement that is less than the at least one signal measurement received from the computing device; and based on the first reference data point and the second reference data point, determining a position of the computing device that reflects an actual position of the computing device more accurately than the estimated position of the computing device.

10. The system of claim 9, wherein determining the estimated position of the computing device comprises determining the estimated position of the computing in a fingerprint map using the at least one signal measurement in a trilateration method.

11. The system of claim 9, wherein the plurality of acts comprise:
selecting reference data points that are within a threshold distance of the estimated position of the computing device,
wherein the reference data points include the first reference data point and the second reference data point.

12. The system of claim 9, wherein determining the position of the computing device that reflects the actual position of the computing device more accurately than the estimated position of the computing device comprises:
interpolating the first reference data point and the second reference data point;
determining whether the interpolated first and second reference data points are collinear with the estimated position of the computing device; and
determining the position of the computing device based on locations of other computing devices associated with collinear reference data points.

13. The system of claim 9, wherein the plurality of acts comprise:
receiving position survey data from other computing devices; and
based on the position survey data, generating reference data points,
wherein the first reference data point and the second reference data points are selected from the reference data points.

14. The system of claim 9, wherein the at least one signal measurement includes a Reference Signal Received Power measurement.

15. The system of claim 9, wherein:
selecting the first reference data point comprises selecting the first reference data point using a threshold distance from the estimated position of the computing device, and
selecting the second reference data point comprises selecting the second reference data point using the threshold distance from the estimated position of the computing device.

16. The system of claim 9, wherein determining the position of the computing device that reflects the actual position of the computing device more accurately than the estimated position of the computing device is based on a location of a base station associated with the first and second reference data points.

17. One or more computer-readable storage media storing computer-executable instructions that upon execution cause one or more computers to perform acts comprising
receiving at least one signal measurement from a computing device;
based on the at least one signal measurement received from the computing device, determining an estimated position of the computing device;
selecting a first reference data point that includes (i) first location data that is in a vicinity of the estimated position of the computing device and (ii) a first signal measurement that is greater than the at least one signal measurement received from the computing device;
selecting a second reference data point that includes (i) second location data that is in the vicinity of the estimated position of the computing device and (ii) a second measurement that is less than the at least one signal measurement received from the computing device; and
based on the first reference data point and the second reference data point, determining a position of the computing device that reflects an actual position of the computing device more accurately than the estimated position of the computing device.

18. The media of claim 17, wherein determining the estimated position of the computing device comprises determining the estimated position of the computing in a fingerprint map using the at least one signal measurement in a trilateration method.

19. The media of claim 17, wherein the acts comprise:
selecting reference data points that are within a threshold distance of the estimated position of the computing device,
wherein the reference data points include the first reference data point and the second reference data point.

20. The media of claim 17, wherein determining the position of the computing device that reflects the actual position of the computing device more accurately than the estimated position of the computing device comprises:
interpolating the first reference data point and the second reference data point;
determining whether the interpolated first and second reference data points are collinear with the estimated position of the computing device; and
determining the position of the computing device based on locations of other computing devices associated with collinear reference data points.

* * * * *